United States Patent Office 3,266,931
Patented August 16, 1966

3,266,931
PROCESS AND COMPOSITION FOR FIXING PIGMENTS ON FIBROUS MATERIALS
Hans Zimmermann, Hofheim, Taunus, Gerhard Pfeiffer, Kelkheim, Taunus, and Kurt Stetzelberg, Frankfurt am Main, Germany, assignors to Farbwerke Hoechst Aktiengesellschaft vormals Meister Lucius & Brüning, Frankfurt am Main, Germany, a corporation of Germany
No Drawing. Filed Dec. 7, 1962, Ser. No. 242,894
Claims priority, application Germany, Dec. 9, 1961, F 35,519
8 Claims. (Cl. 117—138.8)

German Patent No. 971,871 provides a process for fixing pigments on fibrous material, wherein aqueous solutions of alkali-soluble condensation resins containing reactive carboxyl groups and obtained by the reaction of polyvalent acids with polyhydric alcohols, if required also plasticizers, in addition to pigments and polyfunctional products obtained by the reaction of at least two mols of α,β-alkyleneimines with phosphoroxy halides, cyanuric acid halides or polysulfonic acid halides, are applied to the fibrous material and the material so treated is dried, if required at an elevated temperature, and steamed or thermofixed for a short time.

German Patent No. 1,104,927 provides an improvement of the above described process, according to which water-soluble, if desired also partially etherified, precondensation products of phenol, melamine or of the derivatives thereof, and aldehydes are applied additionally to the fibrous material, whereby also the resistance to washing and to solvents of the pigment dyeings is increased.

The object of the present invention is a further development of the processes of the said German Patents Nos. 971,871 and 1,104,927 which consists in using as cross-linking agents N-(dialkyleneimido-phosphonyl)-ureas instead of the polyfunctional products obtained by the reaction of at least two mols of α,β-alkyleneimines with phosphoroxy halides, cyanuric acid halides or polysulfonic acid halides.

We have found that pigments can be fixed on fibrous materials and foils so that they are resistant to rubbing and washing, when the pigments are applied on the materials from an aqueous preparation which contains, in addition to the pigment, a resinous alkali-soluble condensation product containing reactive carboxyl groups and obtained by the reaction of a polybasic acid with a polyhydric alcohol, an N-(dialkyleneimido-phosphonyl)-urea of the general formula

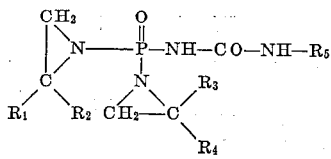

in which $R_1$, $R_2$, $R_3$ and $R_4$ represent hydrogen or a low molecular alkyl radical, preferably with 1 or 2 carbon atoms, and $R_5$ represents an aromatic radical or a saturated or unsaturated alkyl, cycloalkyl or aralkyl radical, and, if required, a water-soluble precondensation product of phenols, melamine, urea or of the derivatives thereof, and an aldehyde, and, if necessary, a thickener and/or another additive, the material treated is dried and the pigment is fixed on the material by a steaming process or by dry heating.

After application of the preparations, for example, of the printing pastes or padding liquors, on the material to be dyed according to the conventional printing and dyeing methods and after subsequent drying, fixation is carried out advantageously by neutral or acidic steaming or by dry heating to temperatures above 70° C., preferably to temperatures above 100° C.

The N-dialkyleneimido-phosphonyl)-ureas used in accordance with the present invention are physiologically better tolerated than the polyfunctional alkyleneimino compounds used in the said German Patents Nos. 971,-871 and 1,104,927, obtained by the reaction of at least two mols of α,β-alkyleneimine with phosphoroxy halides, cyanuric acid halides or polysulfonic acid halides. Further, the storability of aqueous preparations, especially of printing pastes, prepared with the N-(dialkylene imido phosphonyl)-ureas is far better.

The N-(dialkylene imido phosphonyl)-ureas used in accordance with the present invention can be prepared by the process described in Belgian Patent No. 610,695. According to the said process, equimolar quantities of a dihalogeno phosphonyl isocyanate and of a primary amine are reacted and the reaction product is treated with at least two equivalents of an α,β-alkylene imine in the presence of hydrogen chloride-binding agents. The dihalogeno phosphonyl isocyanates used as the starting substances may be prepared, for example, by the method described by Kirsanov, Zuhr., Obshehei Kim 24, 1033 (1954), cf. Chem. Abstr. 49, 8787 (1955). Dichlorophosphonylisocyanate is especially suitable as the starting substance.

As amines which are to be reacted with the dihalogeno phosphonyl isocyanates, there enter into consideration saturated primary alkylamines, preferably those containing 1 to 12 carbon atoms. There are mentioned by way of example: ethylamine, butylamine, isobutylamine, octylamine, dodecylamines; unsaturated primary alkylamines i.e., alkenylamines such as allylamine, crotylamine; cycloaliphatic amines such as cyclopentylamine, cyclohexylamine, 4-methylcyclohexylamine, cycloheptylamine; aralkylamines such as benzylethylamine, phenylethylamine; arylamines such as aniline and toluidine.

As α,β-alkylene imine component, there may be used in the first instance ethylene imine and 2-methylethylene imine. However, other mono- or di-C-alkyl derivatives of ethylene imine such as 2,2-dimethylethylene imine may also be used.

The reaction of the dihalogeno phosphonyl isocyanates with the primary amines may be carried out at temperatures ranging from about −40° C. to +80° C., preferably from −25° C. to +30° C., in an inert organic solvent, for example, aliphatic, cycloaliphatic or aromatic hydrocarbons such as petroleum ether, cyclohexane, benzene, toluene, xylene, or aliphatic or cyclic ethers such as diethyl ether, dioxane or tetrahydrofurane, halogenated hydrocarbons such as methylene chloride, carbon tetrachlorides, chloroform, trichlorethylene, and trichlorethane.

The dihalogeno phosphonyl ureas obtained as intermediate products are reacted suitably at once in the presence of the inert organic solvent with at least two equivalents of an α,β-alkyleneimine to form N-(dialkylene imido phosphonyl)-urea. The second reaction step is generally carried out at temperatures in the range from 0 to 80° C., preferably at temperatures of up to 30° C.

As N-(dialkylene imido phosphonyl)-ureas which are especially suitable for the process of the present invention, there are mentioned by way of example: N-bis-(ethylene imido phosphonyl)-N'-isobutyl urea, N-bis-(methylethylene imido phosphonyl)-N'-isobutyl urea, and N-bis-(ethylene imido phosphonyl)-N'-phenyl urea. There may also be used mixtures of the different N-(dialkylene imido phosphonyl)-ureas which contain two or more $\alpha,\beta$-alkylene imino groups, or mixtures of compounds of this kind with the polyfunctional reaction products used in the process of said German Patent No. 971,871, and obtained by the reaction of at least two mols of $\alpha,\beta$-alkylene imine with phosphoroxy halides, cyanuric acid halides or polysulfonic acid halides, or, if required, also mixtures of these compounds with monoalkylene imine compounds.

As alkali-soluble resinous condensation products to be used as binders in the process of the present invention, there enter into consideration the incompletely condensed reaction products of polyhydric alcohols and polycarboxylic acids mentioned in German Patent 971,871. The resinous condensation products are used preferably in the form of their salts with volatile basic compounds such as ammonia, mono- di- or triethanolamine. The resinous condensation products may contain, incorporated by condensation, besides the polyfunctional carboxylic acids, also saturated or unsaturated monocarboxylic acids, and besides polyhydric alcohols also monohydric long-chain alcohols, for example, cetyl alcohols.

As water-soluble precondensation products of phenols, urea or melamine and aldehydes, which may be used simultaneously, there enter into consideration the compounds disclosed in the said German Patent 1,104,927. Preferably, there are used etherified or nonetherified methylol compounds of urea, alkylated ureas or melamine. Further, there are also suitable products such as tetramethylol acetylene diurea and condensation products of phenols, alkyl phenols and formaldehyde.

As thickeners there may be used: alginates, mucilages, carob bean flour, dextrin, cellulose ether carboxylic acids, salts of polyacrylic acid, polyvinyl alcohol, etc. However, the known fact must then be taken into consideration that these substances, if used in larger amounts, cause undesired hardening of the prints. In order to obtain prints which are ready for use without aftertreatment, it is advantageous to use thickeners prepared by emulsifying water-insoluble or sparingly soluble organic solvents into water in such a manner that these solvents are in the inner phase. The use of such known oil-in-water emulsions retains the advantage of purely aqueous printing pastes or dyeing liquors, such as the capability of dilution with water, easy cleaning of machine parts, lesser fire hazard, without having to put up with the disadvantages involved by the use of swellable thickeners such as the stiffening of the handle, reduced resistance to washing and rubbing, poorer brilliance and smaller yield. Mixtures of swellable thickenings and oil-in-water emulsions may also be used.

For the preparation of the highly viscous, smooth oil-in-water emulsions there are suitable hydrocarbons such as benzine, diesel oil, toluene, xylene, etc., as well as chlorinated hydrocarbons and turpentine oil.

The boiling point of these solvents should preferably not be below 70° C. Advantageously, the upper boiling limit should be chosen to effect, during drying of the goods, as complete evaporation of the solvent as possible. If water-insoluble resins are used concurrently as binders, they may be incorporated into the solutions or dispersions of the resinous condensation products by emulsification or they may be dissolved in the solvent required for the formation of the emulsion.

The oil-in-water emulsions can be prepared in known manner by stirring the organic solvent into an aqueous solution of emulsifier, for example, an aqueous solution of protein substances or oxyethylated compounds. However, the organic solvent may also be introduced in small portions, while stirring vigorously, into the aqueous solution of the salt of a resinous condensation product which simultaneously serves as emulsifier, if necessary in the presence of a protective colloid.

In pigment padding, the use of thickeners is not necessary in all cases.

As further additives, there may be added to the preparations, for example, softening agents such as dibutylphthalate and natural or synthetic resins, for example, caoutchouc, or carbamide resins or their products of transformation, siccative oils or polymeric compounds which contain reactive groups, and, if required, condensation accelerators.

By the addition of natural or synthetic latices on butadiene, acrylate or vinylate base to the preparations, the resistance to rubbing in dry state of the pigment dyeings can often be further improved. The addition of potentially acidic hardeners such as the ammonium salts of mineral acids is normally not necessary, because, when volatile alkalines are used after the drying of the prints, the resinous condensation product as a macromolecular acid has a hardening effect on the aldehyde precondensation products. When renouncing the use of such hardeners, the stability of the printing colour is improved. Furthermore, the risk of fiber damage is reduced to a minimum.

As pigments which may be used for the process of the present invention, there are suitable the known pigment dyestuffs of mineral or organic origin. There are mentioned by way of example: titanium dioxide, iron hydroxide (hydrate), metal powders such as aluminium or bronze powder, furthermore carbon black, blue ultramarine, and other mineral pigments on oxide or sulfide basis, organic pigments such as azopigments, vat dyestuffs on quinone and indigo basis, phthalocyanine dyestuffs, bisoxazine dyestuffs, perylene tetracarboxylic acid dyestuffs and quinacridone dyestuffs, as mentioned in U.S. specifications 2,844,484, 2,844,581 and 2,844,485. By azo-pigments are to be understood azo-dyestuffs which are obtained by the coupling of diazo- or tetrazo-compounds of amines without water-solubilizing groups with the coupling components usual in pigment chemistry. As coupling components, there enter into consideration, for example, naphthols, oxynaphthoic acid arylides, pyrazolones, acetoacetic acid arylides, and so on. If these dyestuffs contain sulfonic acid groups or carboxylic acid groups, they may be used in the form of the colour lakes prepared with alkaline earth metal salts.

As fibrous materials and foils such as fabrics, knit fabrics, fiber fleeces, and so on, there enter into consideration: fibrous material and flat structures made of native or regenerated cellulose, acetylated cellulose, wool, silk, or of fully synthetic fibers such as polyamide, polyester, polyacrylonitrile and polyvinylchloride fibers, further of glass fibers or asbestos. Pigment dyeings may also be produced on paper, cardboard, and foils of any kind.

The following examples illustrate the invention but they are not intended to limit it thereto:

EXAMPLE 1

50 parts by weight of an ammonium caseinate solution of 25% strength were mixed with 50 parts by weight of an aqueous ammoniacal solution of 30% strength of the condensation product of 1 mol of hexanetriol-(1,3,5) and 1.2 mol of phthalic acid anhydride, 3 parts by weight of an alkylaryl-polyglycol ether and 10 parts by weight of an aqueous ammonium thiocyanate solution of 50% strength. 750 parts by weight of an aliphatic hydrocarbon having a boiling range from 180 to 230° C. were emulsified into this mixture while portionwise adding 137 parts by weight of water. There was obtained a smooth oil-in-water emulsion.

Printing paste 735 parts by weight of the above emulsion were mixed with

- 150 parts by weight of an aqueous ammoniacal solution of 30% strength of the condensation product of 1 mol of hexanetriol-(1,3,5) and 1.2 mols of phthalic acid anhydride,
- 50 parts by weight of an aqueous paste of 40% strength of copper phthalocyanine,
- 25 parts by weight of N-bis-(ethylimido)-phosphonyl-N'-isobutyl urea, and
- 40 parts by weight of an aqueous solution of 65% strength of a precondensation product of melamine, ethylene glycol and formaldehyde, 1000 parts by weight.

A cotton fabric was printed with this paste according to the machine printing process; the fabric was heated, after drying, for 5 minutes to 150° C. There was obtained a brilliant blue print that had good properties of fastness.

EXAMPLE 2

*Printing paste*

720 parts by weight of the emulsion described in Example 1 were mixed with

- 150 parts by weight of an aqueous ammoniacal solution of 30% strength of the condensation product of 1 mol of hexanetriol-(1,3,5) and 1.2 mols of phthalic acid anhydride,
- 40 parts by weight of an aqueous paste of 40% strength of highly chlorinated copper phthalocyanine,
- 30 parts by weight of N-bis-(methylethylene-imido)-phosphonyl-N'-isobutyl urea, and
- 60 parts by weight of an aqueous solution of 50% strength of hexamethylol melamine partially etherified with methanol, 1000 parts by weight.

A staple fiber fabric was printed with this printing paste according to the roller printing method. After drying, the fabric was heated for 5 minutes to 130° C. There was obtained a bright green print which was found to have very good fastness properties. The same effect was also achieved when steaming for 10 minutes in a rapid steamer instead of heating.

EXAMPLE 3

*Printing paste*

855 parts by weight of the emulsion described in Example 1 were mixed with

- 100 parts by weight of an aqueous ammoniacal solution of 30% strength of the condensation product of 1 mol of hexanetriol-(1,3,5) and 1.2 mols of phthalic acid anhydride,
- 25 parts by weight of an aqueous paste of 40% strength of the trans-form of the condensation product of naphthalene-tetracarboxylic acid and o-phenylenediamine,
- 10 parts by weight of N-bis-(ethyleneimido)-phosphonyl-N'-isobutyl urea, and
- 10 parts by weight of N-bis-(ethyleneimido)-phosphonyl-N'-phenyl urea, 1000 parts by weight.

A cotton or staple fiber fabric was printed with this paste according to the screen printing process and, after drying and steaming or thermofixing for 10 minutes, there was obtained a bright orange print that had good fastness properties.

EXAMPLE 4

*Padding solution*

- 30 parts by weight of an aqueous ammoniacal solution of 30% strength of the condensation product of 1 mol of hexanetriol-(1,3,5) and 1.2 mols of phthalic acid anhydride were mixed with
- 3 parts by weight of an aqueous dispersion of 38% strength of the coupling product of 2 mols of 2,5-dimethoxy-4-chloracetoacetic acid anilide and 1 mol of 2,2'-dichlorobenzidine,
- 50 parts by weight of an aqueous sodium alginate thickening of 4% strength,
- 15 parts by weight of an aqueous dispersion of 50% strength of polyvinyl acetate,
- 20 parts by weight of N-bis-(methylethyleneimido)-phosphonyl-N'-isobutyl urea, and
- 20 parts by weight of an aqueous solution of 65% strength of the precondensation product of melamine, ethylene glycol and formaldehyde, and made up with water to a volume of 1000 parts by weight.

A staple fiber fabric was padded with this solution and after drying the fabric was heated for 10 minutes to 140° C. There was obtained a yellow dyeing which was found to be fast to light and washing and also proved resistant to the solvents conventionally used in dry cleaning.

EXAMPLE 5

A ductile printing paste was obtained by mixing

- 50 parts by weight of an aqueous preparation of 40% strength of copper phthalocyanine,
- 130 parts by weight of an aqueous ammoniacal solution of 50% strength of phthalic acid pentaerythrite ester (acid number 175),
- 30 parts by weight of N-bis-(methylethylene-imido)-phosphonyl-N'-isobutyl urea,
- 128 parts by weight of an ammonium caseinate solution of 25% strength,
- 1 part by weight of triethanolamine,
- 5 parts by weight of an alkylaryl-polyglycol ether,
- 60 parts by weight of an aqueous solution of a hexymethylolmelaminemethyl ether, and
- 171 parts by weight of water and subsequently emulsifying into this solution
- 425 parts by weight of an aliphatic hydrocarbon having a boiling range from 190–220° C., 1000 parts by weight.

A cotton or staple fiber fabric was printed with this paste according to machine printing. After drying and following heating for 5 minutes to 150° C., there was obtained a print which was found to have good fastness properties.

EXAMPLE 6

*Printing paste*

770 parts by weight of the emulsion described in Example 1 were mixed with

- 150 parts by weight of an aqueous ammoniacal solution of 30% strength of the condensation product of 1 mol of hexanetriol-(1,3,5) and 1.2 mols of phthalic acid anhydride,
- 50 parts by weight of an aqueous dispersion of 42.5% strength of 5,5'-dichloro-7,7'-dimethylthio-indigo, and
- 30 parts by weight of N-bis-(ethyleneimido)-phosphonyl-N'-phenyl urea.

A polyester fabric was printed according to the machine printing method with the printing paste thus prepared. After drying, fixation was carried out by steam-

We claim:
1. Aqueous composition for fixing an insoluble, inert pigment on fibrous materials and foils, said composition comprising (1) an alkali-soluble condensation product of a poly-basic carboxylic acid and a polyhydric aliphatic alcohol, said condensation product containing reactive carboxyl groups, and (2) an N-(dialkylene imido phosphonyl)-urea of the formula

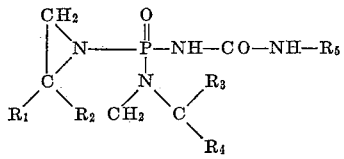

in which $R_1$, $R_2$, $R_3$ and $R_4$ represent members selected from the group consisting of hydrogen and low molecular alkyl, and $R_5$ represents a member selected from the group consisting of aryl, aralkyl, cycloalkyl, alkenyl and alkyl radicals containing up to 12 carbon atoms.

2. Composition as defined in claim 1 further containing a water-soluble condensation product of an aldehyde and a member selected from the group consisting of phenol, melamine, urea, and a derivative thereof.

3. Composition as defined in claim 1 wherein the second component is N-bis-(ethylene imido)-phosphonyl-N'-isobutyl urea.

4. A process for fixing pigments on fibrous materials and foils which comprises applying to the material to be pigmented, an aqueous composition comprising (a) an insoluble, inert pigment, (b) a resinous alkali-soluble condensation product of a polybasic carboxylic acid and a polyhydric alcohol, said condensation product containing reactive carboxyl groups and dissolved in an alkaline medium, and (c) an N-(dialkylene imido phosphonyl)-urea of the formula

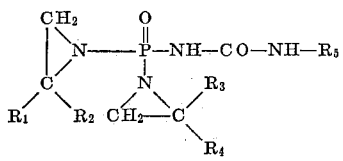

in which $R_1$, $R_2$, $R_3$ and $R_4$ represent members selected from the group consisting of hydrogen and low molecular alkyl, and $R_5$ represents a member selected from the group consisting of aryl, aralkyl, cycloalkyl, alkenyl and alkyl radicals containing up to 12 carbon atoms, and drying and heating the materials.

5. A process as defined in claim 4, wherein the aqueous composition contains, as additional component (d) a water-soluble condensation product of an aldehyde and a member selected from the group consisting of phenol, melamine, urea, and a derivative thereof.

6. A process as defined in claim 4, wherein component (c) is N-bis-(ethylene imido)-phosphonyl-N'-isobutyl urea.

7. A process as defined in claim 4, wherein the aqueous composition contains, as additional component, (e) an oil-in-water emulsion as thickener.

8. Fibrous material or foil pigmented by applying thereto an aqueous composition comprising (a) an insoluble, inert pigment, (b) a resinous alkali-soluble condensation product of a polybasic carboxylic acid and a polyhydric alcohol, said condensation product containing reactive carboxyl groups and dissolved in an alkaline medium, and (c) an N-(dialkylene imido phosphonyl)-urea of the formula

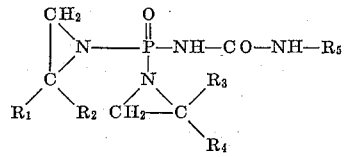

in which $R_1$, $R_2$, $R_3$ and $R_4$ represent members selected from the group consisting of hydrogen and low molecular alkyl, and $R_5$ represents a member selected from the group consisting of aryl, aralkyl, cycloalkyl, alkenyl and alkyl radicals containing up to 12 carbon atoms, and drying and heating the same.

References Cited by the Examiner

UNITED STATES PATENTS

| | | | |
|---|---|---|---|
| 2,616,818 | 11/1952 | Azorlosa | 117—155 |
| 2,695,895 | 11/1954 | Barnard et al. | 117—145 |
| 2,961,349 | 11/1960 | Bartl et al. | 117—126 X |
| 3,048,501 | 8/1962 | Miller et al. | 117—155 |
| 3,053,783 | 9/1962 | Broadhead et al. | 260—29.2 |
| 3,067,158 | 12/1962 | Bolton | 260—29.2 |
| 3,148,164 | 9/1964 | Enders et al. | 117—145 |

FOREIGN PATENTS

| | | |
|---|---|---|
| 610,695 | 5/1962 | Belgium. |
| 971,871 | 11/1952 | Germany. |
| 1,104,927 | 4/1961 | Germany. |

MURRAY KATZ, *Primary Examiner.*

RICHARD D. NEVIUS, *Examiner.*

A. H. ROSENSTEIN, *Assistant Examiner.*